United States Patent
Morrow

(10) Patent No.: US 9,038,232 B1
(45) Date of Patent: May 26, 2015

(54) WHEELED SUCTION AND BLOWER APPARATUS

(71) Applicant: Myron L. Morrow, Coon Rapids, MN (US)

(72) Inventor: Myron L. Morrow, Coon Rapids, MN (US)

( * ) Notice: Subject to any disclaimer, the term of this patent is extended or adjusted under 35 U.S.C. 154(b) by 108 days.

(21) Appl. No.: 13/864,489

(22) Filed: Apr. 17, 2013

Related U.S. Application Data

(60) Provisional application No. 61/703,807, filed on Sep. 21, 2012.

(51) Int. Cl.
*A47L 5/14* (2006.01)

(52) U.S. Cl.
CPC ........................ *A47L 5/14* (2013.01)

(58) Field of Classification Search
USPC ............. 15/300.1, 345, 312.2, 361, 338, 330, 15/405, 337
See application file for complete search history.

(56) References Cited

U.S. PATENT DOCUMENTS

| | | | | | |
|---|---|---|---|---|---|
| 3,618,157 | A | * | 11/1971 | Bassin | 15/330 |
| 4,076,460 | A | * | 2/1978 | Roof | 417/236 |
| 4,118,826 | A | * | 10/1978 | Kaeser | 15/328 |
| 4,567,623 | A | * | 2/1986 | Walton | 15/337 |
| 5,735,018 | A | * | 4/1998 | Gallagher et al. | 15/405 |
| 6,226,833 | B1 | * | 5/2001 | Kawaguchi et al. | 15/405 |
| 6,253,416 | B1 | * | 7/2001 | Lauer et al. | 15/361 |
| 7,004,688 | B2 | * | 2/2006 | Tasker | 406/39 |
| 7,823,252 | B2 | * | 11/2010 | Labrasciano | 15/405 |
| 8,056,180 | B2 | * | 11/2011 | Iacona | 15/312.2 |

* cited by examiner

*Primary Examiner* — Dung Van Nguyen
(74) *Attorney, Agent, or Firm* — Dave Alan Lingbeck

(57) ABSTRACT

A wheeled suction and blower apparatus for either sucking up debris or blowing debris. The wheeled suction and blower apparatus includes a base member supported upon wheels and being towed behind a prime mover; a motor supported upon the base member; a housing with an impeller being in communication with the motor; a chute fastenable to the housing; a hood being pivotally attached to the chute; and an actuating assembly for adjusting the positioning of the hood.

7 Claims, 3 Drawing Sheets

WHEELED SUCTION AND BLOWER APPARATUS

CROSS-REFERENCE TO RELATED APPLICATIONS

The present application claims the benefit of the U.S. provisional application Ser. No. 61/604,382, filed on Sep. 21, 2012, the disclosure of which is expressly incorporated by reference herein in its entirety.

BACKGROUND OF THE INVENTION

1. Field of the Invention

The present invention relates to suction/blower devices and more particularly pertains to a new wheeled suction and blower apparatus for either sucking up debris or blowing debris.

2. Description of the Prior Art

The use of suction/blower devices is known in the prior art. More specifically, suction/blower devices heretofore devised and utilized are known to consist basically of familiar, expected and obvious structural configurations, notwithstanding the myriad of designs encompassed by the crowded prior it which have been developed for the fulfillment of countless objectives and requirements.

SUMMARY OF THE INVENTION

The general purpose of the present invention, which will be described subsequently in greater detail, is to provide a new wheeled suction and blower apparatus which has many of the advantages of the suction/blower devices mentioned heretofore and many novel features that result in a new wheeled suction and blower apparatus which is not anticipated, rendered obvious, suggested, or even implied by any of the prior art suction/blower devices, either alone or in any combination thereof. The present invention includes a base member supported upon wheels and being towed behind a prime mover; a motor supported upon the base member; a housing with an impeller being in communication with the motor; a chute fastenable to the housing; a hood being pivotally attached to the chute; and an actuating assembly for adjusting the positioning of the hood.

There has thus been outlined, rather broadly, the more important features of the wheeled suction and blower apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various Also, it is to be understood that the phraseology and terminology employed herein are for the purpose of description and should not be regarded as limiting.

It is an object of the present invention to provide a new wheeled suction and blower apparatus which has many novel features that result in a new wheeled suction and blower apparatus which is not anticipated, rendered obvious, suggested, or even implied by any of the prior art suction/blower devices, either alone or in any combination thereof.

Still another object of the present invention is to provide a new wheeled suction and blower apparatus for either sucking up debris or blowing debris.

Still yet another object of the present invention is to provide a new wheeled suction and blower apparatus that allows a user to attach the wheeled apparatus to a mover and quickly remove or move debris as desired.

Even still another object of the present invention is to provide a new wheeled suction and blower apparatus that can be quickly adapted or changed from sucking debris and depositing it into a bin or blowing debris that is upon a ground as desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
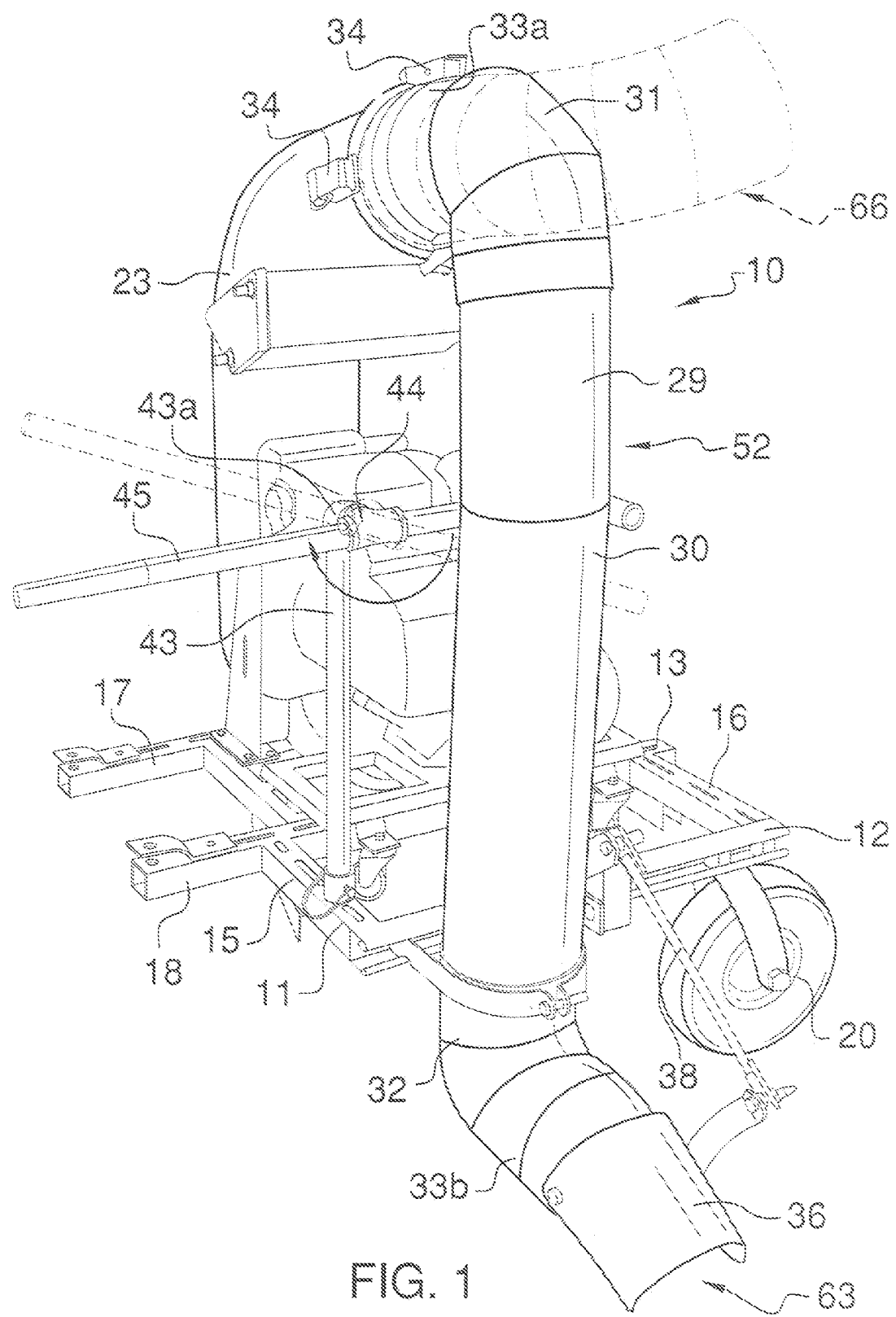
FIG. 1 is a front and side perspective view of a new wheeled suction and blower apparatus according to the present invention.
Figure 2:
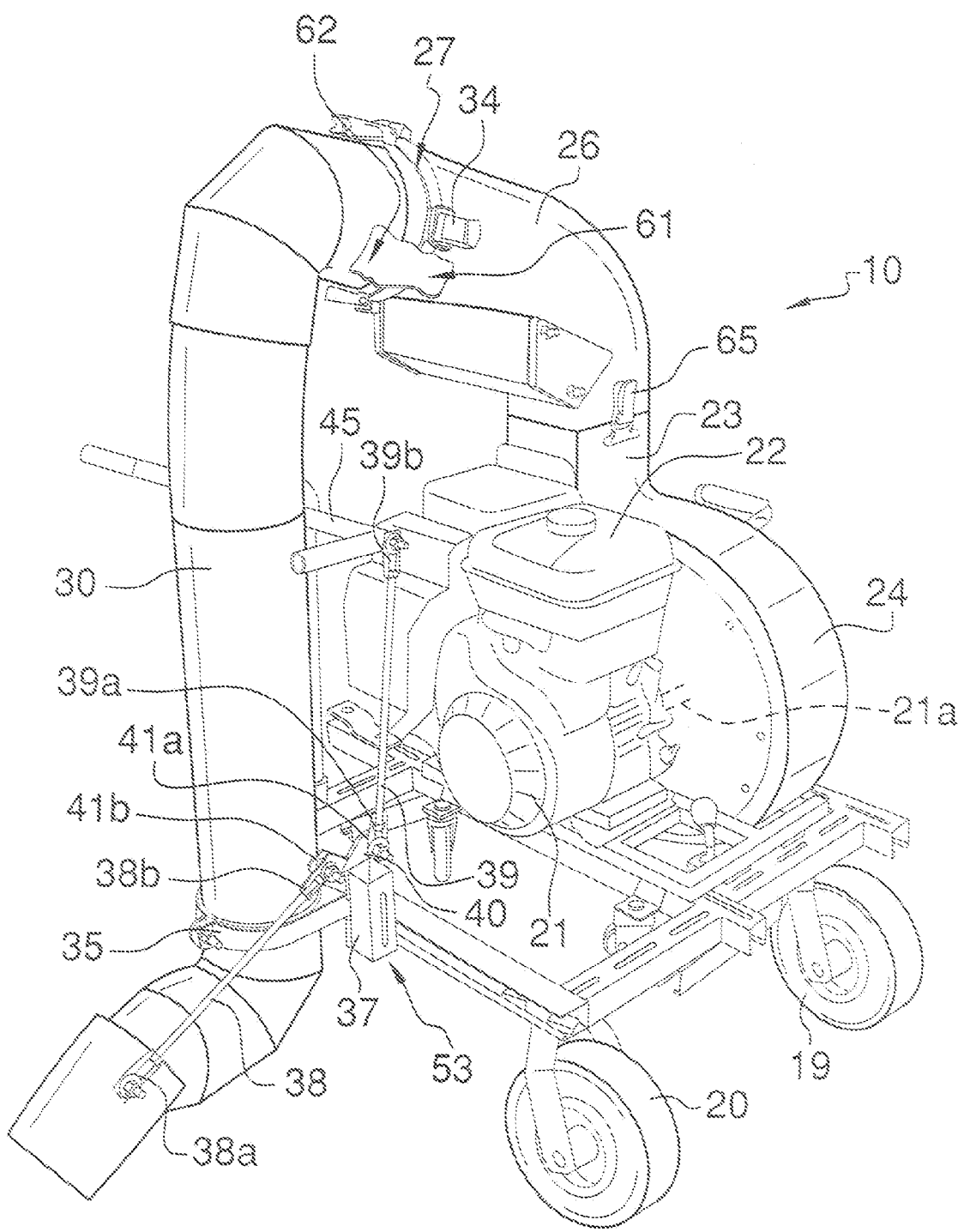
FIG. 2 is a back and side perspective view of the present invention.
Figure 3:
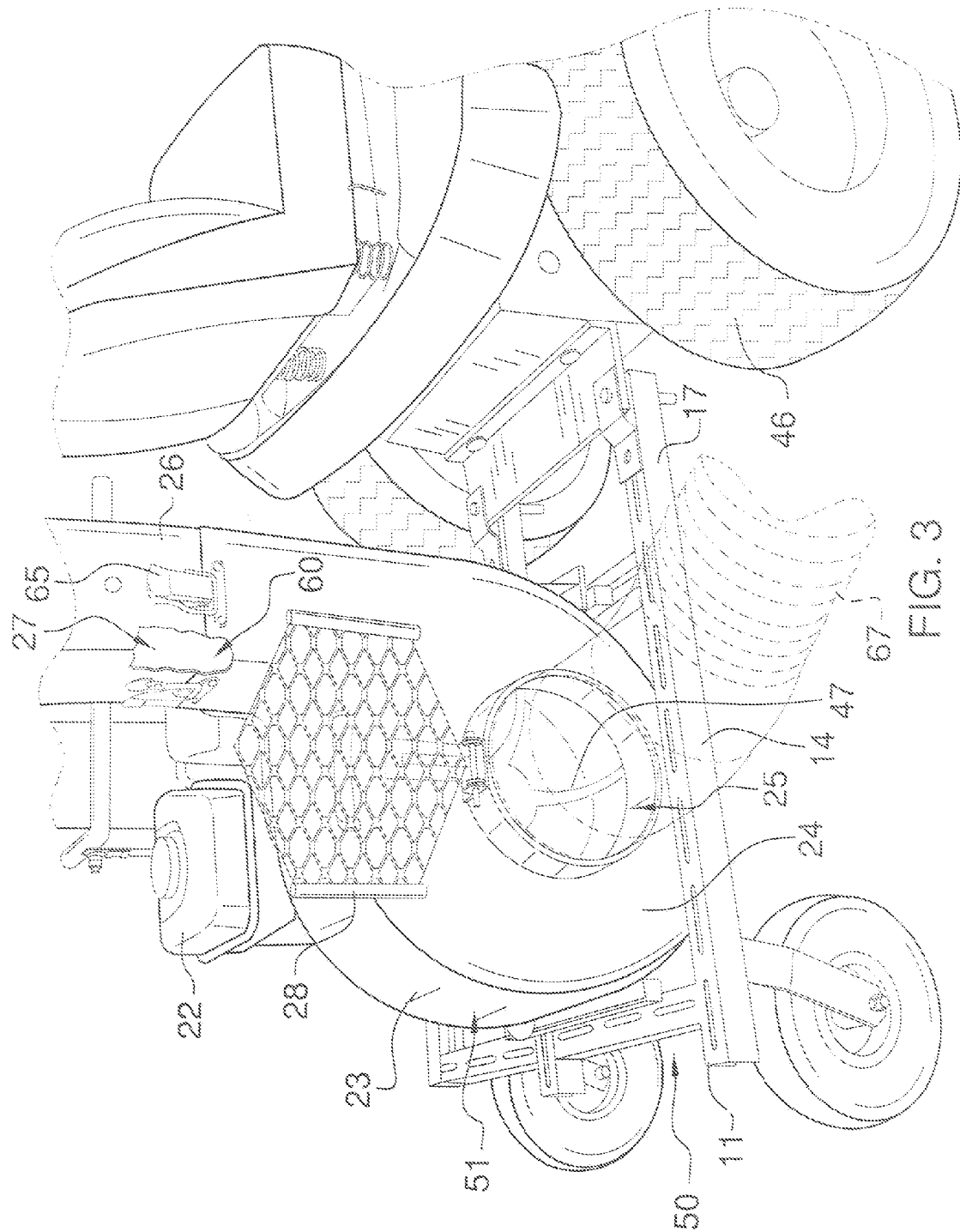
FIG. 3 is a side perspective view of the present invention.

With reference now to the drawings, and in particular to FIGS. 1 through 3 thereof, a new wheeled suction and blower apparatus embodying the principles and concepts of the present invention and generally designated by the reference numeral 10 will be described.

As best illustrated in FIGS. 1 through 3, the wheeled suction and blower apparatus 10 generally comprises a trailer assembly 50 including a base member 11 conventionally mounted upon wheels 19, 20; a blower and suction assembly 51 conventionally supported upon the trailer assembly 50 for generating suction and forced air; a duct assembly 52 being in fluid communication with the blower and suction assembly 51 for transporting air and debris; and a duct adjustable assembly 53 being in communication with the duct assembly 52.

As shown in FIG. 3, the base member 11 has elongate members 12-14 being spaced apart and having cross members 15, 16 interconnecting the elongate members 12-14 with the base member 11 also having tongue members 17, 18 for conventionally hitching to a prime mover 46. The base member 11 is conventionally supported upon wheels 19, 20. A motor 21 is securely and conventionally mounted and fastened upon the base member 11 and is also in conventional communication with a fuel tank 22 for supplying fuel to the motor 21. A housing 23 may also be securely and conventionally mounted and fastened with fasteners upon the base member 11 and also having a top wall with a flue 60 extending therethrough into and from the housing 23. An impeller 47 may be rotatably and conventionally mounted inside the housing 23 and is in communication with and conventionally connected to a rotatable shaft 21a of the motor 21. The housing 23 may have a lower portion 24 and an opening 25 being disposed in the lower portion 24 adjacent the impeller 47. A screen member 28 may be hingedly and conventionally attached to the housing 23 above the opening 25 in the lower portion 24 and being removably disposed over the opening 25 in the lower portion 24.

As illustrated in FIG. 1, the duct assembly may include a first chute 26 with open inlet and outlet ends 27, 61. The first chute 26 at the open inlet end 27 may be removably and conventionally coupled to the flue 60 with first clamping members 65 as illustrated in the drawings. The duct assembly 52 may also include a second chute 29 with open inlet and outlet ends 62, 63. The second chute 29 at the open inlet end 62 of the second chute 29 may be removably coupled to the first chute 26 at the open outlet end 61 of the first chute 26 with second clamping members 34 to form a continuous passageway through the first and second chutes 26, 29. The first chute 26 may be adapted to removably connect to a flexible conduit 66 at the open outlet end 61 of the first chute 26 for transporting debris to a separate receptacle.

The second chute 29 may include a plurality of duct sections 30-33a-b. The duct sections 30-33a-b include an elongate duct section 30, upper and lower elbow duct sections 31, 32 conventionally connected at opposed ends of the elongate duct section 30, and shorten duct sections 33a-b conventionally connected to the upper and lower elbow duct sections 31, 32. The lower elbow duct section 32 is adapted to be disposed at ground level when in use.

As illustrated in FIG. 2, the duct assembly 52 further includes a hood 36 hingedly and conventionally attached to the second chute 29 at the open outlet end 63 thereof to direct the forced air exiting the second chute 29. The open outlet end 63 of the second chute 29 is adapted to be disposed at ground level when in use to blow debris upon a ground from forced air exiting the second chute 29.

The duct adjustable assembly 53 includes an elongate lever support 43 conventionally and securely mounted upon the base member 11 and extending upwardly and having a curved top end 43a, and further includes a sleeve 44 conventionally connected to the top end 43a of the elongate lever support 43, and also includes a lever 45 engagably extending through the sleeve 44 with the lever 45 being pivotal at the sleeve 44 and adapted to be accessible by a user riding on a prime mover 46. The duct adjustable assembly 53 further includes a pivot support 37 securely and conventionally mounted to the base member 11 with a ring clamp 35, and also includes a pivot 40 pivotally and conventionally attached to the pivot support 37. The duct adjustable assembly 53 further includes a first linkage 38 with a first end 38a conventionally coupled to the hood 36 with a fastener and with a second end 38b conventionally coupled with another fastener to the pivot 40 to move the hood 36 up or down relative to the ground to direct the forced air exiting the open outlet end 63 of the second chute 29. The duct adjustable assembly 53 also includes a second linkage 39 with a first end 39a conventionally coupled to the pivot 40 with yet another fastener and with a second end 39b conventionally coupled to the lever 45 with a fastening member such as a threaded nut. The lever 45 has a threaded end to which the fastening member is threaded to secure the second linkage 39 to the lever 45. The pivot 40 includes wing portions 41 a-b with one wing portion 41a conventionally coupled to the second end 38b of the first linkage 38 and another wing portion 41b conventionally coupled to the first end 39a of the second linkage 39. The wing portions 41a-b are angled relative to one another.

In use, the user hitches the base member 11 to the prime mover 46 and energizes the motor 21 which actuates the impeller 47, and the user moves the wheeled suction and blower apparatus 10 to an area where the user either wants to pick up the debris or move the debris away. If the user uses the blower function of the wheeled suction and blower apparatus 10, the user moves the wheeled suction and blower apparatus 10 adjacent to the debris with the open outlet end of the second chute 29 being adjacent to the debris and depending upon how far the user wants to move the debris, the user will grasp and pivot the lever 45 which moves the first and second linkages 38, 39 which move the hood 36 up or down relative to the ground, and the user will move the wheeled suction and blower apparatus 10 along the ground and blow the debris away. If the user instead wants to pick up the debris, the user conventionally attaches a hose 67 over the opening 25 in the lower portion 24 of the housing 23 with the screen member 28 removed from over the opening 25 and the impeller 47 will suck the debris into the housing 23 and force the debris through the first chute 26 and into a receptacle if so desired by the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the wheeled suction and blower apparatus. Further, since numerous modifications and changes will readily occur to those skilled in the art, it is not desired to limit the invent-on to the exact construction and operation shown and described, and accordingly, all suitable modifications and equivalents may be resorted to, failing within the scope of the invention.

What is claimed is:

1. A wheeled suction and blower apparatus comprising:
   a trailer assembly including a base member mounted upon wheels;
   a blower and suction assembly supported upon said trailer assembly for generating forced air, wherein said blower and suction assembly includes a housing securely mounted upon said trailer assembly and having a front wall with an opening extending therethrough into said housing and also having a top wall with a flue extending therethrough into and from said housing, wherein said blower and suction apparatus also includes a screen hingedly attached to an outside of said front wall of said housing and closeable over said opening through said front wall to prevent unwanted debris from being sucked into said housing and to allow air to be sucked into said housing and through said duct assembly;
   a duct assembly in fluid communication with said blower and suction assembly for transporting air and debris; and
   a duct adjustable assembly in communication with said duct assembly.

2. The wheeled suction and blower apparatus as described in claim 1, wherein said screen is removable over said opening through said front wall to allow debris to be sucked into said housing and through said duct assembly.

3. A wheeled suction and blower apparatus comprising:
   a trailer assembly including a base member mounted upon wheels;
   a blower and suction assembly supported upon said trailer assembly for generating forced air;
   a duct assembly in fluid communication with said blower and suction assembly for transporting air and debris, wherein said blower and suction assembly includes a housing securely mounted upon said trailer assembly and having a front wall with an opening extending therethrough into said housing, wherein said duct assembly includes a first chute with open inlet and outlet ends, and also includes a second chute with open inlet and outlet ends, said second chute at said open inlet end of said second chute removably coupled to said first chute at said open outlet end of said first chute to form a continuous passageway through said first and second chutes, wherein said duct assembly further includes a hood hingedly attached to said second chute at said open outlet end thereof; and
   a duct adjustable assembly in communication with said duct assembly. wherein said duct adjustable assembly includes an elongate lever support mounted upon said base member, and further includes a sleeve connected to a top end of said elongate lever support, and also includes a lever extending through said sleeve, said lever being pivotable at said sleeve and adapted to be accessible by a user riding on a prime mover.

4. The wheeled suction and blower apparatus as described in claim 3, wherein said duct adjustable assembly further includes a pivot support mounted to said base member, and also includes a pivot pivotally attached to said pivot support.

5. The wheeled suction and blower apparatus as described in claim 4, wherein said duct adjustable assembly further includes a first linkage with a first end coupled to said hood and with a second end coupled to said pivot to move said hood up or down relative to a ground to direct the forced air exiting said open outlet end of said second chute.

6. The wheeled suction and blower apparatus as described in claim 3, wherein said duct adjustable assembly also includes a second linkage with a first end coupled to said pivot and with a second end coupled to said lever.

7. The wheeled suction and blower apparatus as described in claim 6, wherein said pivot includes wing portions with one said wing portion coupled to said second end of said first linkage and another said wing portion couple to said first end of said second linkage, said wing portions being angled relative to one another.

* * * * *